(12) United States Patent
Lambert et al.

(10) Patent No.: US 11,010,173 B2
(45) Date of Patent: May 18, 2021

(54) ADJUSTING A PROCESSING STATE OF AN INFORMATION HANDLING SYSTEM FROM MULTI-SOCKET MODE TO MULTI-SINGLE SOCKET MODE

(71) Applicant: Dell Products L.P., Round Rock, TX (US)

(72) Inventors: Timothy M. Lambert, Austin, TX (US); Isaac Q. Wang, Austin, TX (US); Shawn Dube, Austin, TX (US); Johan Rahardjo, Austin, TX (US)

(73) Assignee: Dell Products L.P., Round Rock, TX (US)

(*) Notice: Subject to any disclaimer, the term of this patent is extended or adjusted under 35 U.S.C. 154(b) by 92 days.

(21) Appl. No.: 16/572,705

(22) Filed: Sep. 17, 2019

(65) Prior Publication Data

US 2021/0081214 A1    Mar. 18, 2021

(51) Int. Cl.
*G06F 9/4401* (2018.01)
(52) U.S. Cl.
CPC .... *G06F 9/4411* (2013.01); *G05B 2219/2237* (2013.01)
(58) Field of Classification Search
CPC ............... G06F 9/4411; G06F 9/44505; G06F 13/4282; G05B 2219/1215; G05B 2219/2231; G05B 2215/2233; G05B 2219/2234; G05B 2219/2237
See application file for complete search history.

(56) References Cited

U.S. PATENT DOCUMENTS

| | | | | |
|---|---|---|---|---|
| 5,904,733 A * | 5/1999 | Jayakumar | ............ | G06F 15/177 713/1 |
| 6,925,556 B2 * | 8/2005 | Hill | ........................ | G06F 9/4405 710/240 |
| 2013/0268747 A1 * | 10/2013 | Chang | ........................ | G06F 1/24 713/2 |
| 2015/0007187 A1 * | 1/2015 | Shows | .................... | G06F 9/5088 718/104 |
| 2016/0217105 A1 * | 7/2016 | Khatri | ...................... | G06F 13/28 |
| 2018/0203700 A1 * | 7/2018 | Driever | ................. | G06F 9/5083 |
| 2018/0357108 A1 * | 12/2018 | Mullender | ............ | G06F 3/0613 |
| 2020/0314172 A1 * | 10/2020 | Chu | ..................... | H04L 67/1008 |

OTHER PUBLICATIONS

Hormuth, R. W., Bassani, M., Stack, M., Leaver, D., TopologyTwister, Li, K., . . . Mobley, G. (Apr. 24, 2019). Why Single-Socket Servers Could Rule the Future. Retrieved from https://www.nextplatform.com/2019/04/24/why-single-socket-servers-could-rule-the-future/.

\* cited by examiner

*Primary Examiner* — Raymond N Phan
(74) *Attorney, Agent, or Firm* — Baker Botts L.L.P.

(57) ABSTRACT

Methods, systems, and computer programs encoded on computer storage medium, for receiving a request to switch a mode of an information handling system (IHS) from a multi-socket mode to a multi-single socket mode; in response to receiving the request, placing each socket of the IHS in an auxiliary power state independent of each other; after placing each socket of the IHS in the auxiliary power state, altering parameters of the sockets of the IHS, including: altering CPU straps, power sequencing, reset sequencing, and bus re-direction associated with one or more of the sockets of the IHS; and in response to altering the parameters of the sockets of the IHS, switching the mode of the IHS from the multi-socket mode to the multi-single socket mode such that a processor for each socket is a bootstrap processor.

20 Claims, 5 Drawing Sheets

ADJUSTING A PROCESSING STATE OF AN INFORMATION HANDLING SYSTEM FROM MULTI-SOCKET MODE TO MULTI-SINGLE SOCKET MODE

BACKGROUND

Field of the Disclosure

The disclosure relates generally to information handling systems, and, more particularly, to adjusting a processing state of the information handling system from a multi-socket mode to a multi-single socket mode.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The most common type of server deployed in a datacenter has been a 2-socket system. Offering a balance of compute power and flexible configuration, these systems can support multiple PCIe slots via a matrix of riser card combinations. Nevertheless, the industry is seeing a trend of 1-socket servers gaining popularity due to its reduced cost and extensive I/O counts. These characteristics make it a desirable solution in demanding workload like storage-intensive storage and heterogeneous computing.

SUMMARY

Innovative aspects of the subject matter described in this specification may be embodied in methods including receiving a request to switch a mode of an information handling system (IHS) from a multi-socket mode to a multi-single socket mode; in response to receiving the request, placing each socket of the IHS in an auxiliary power state independent of each other; after placing each socket of the IHS in the auxiliary power state, altering parameters of the sockets of the IHS, including: altering CPU straps, power sequencing, reset sequencing, and bus re-direction associated with one or more of the sockets of the IHS; and in response to altering the parameters of the sockets of the IHS, switching the mode of the IHS from the multi-socket mode to the multi-single socket mode such that a processor for each socket is a bootstrap processor.

Other embodiments of these aspects include corresponding system, apparatus, and computer programs, configured to perform the actions of the methods, encoded on computer storage devices.

These and other embodiments may each optionally include one or more of the following features. For instance, the IHS includes two sockets, and wherein receiving the request includes receiving the request to switch the mode of the IHS from a two-socket mode to a two one-socket mode. The IHS includes four sockets, and wherein receiving the request includes receiving the request to switch the mode of the IHS from a four-socket mode to a four one-socket mode. Prior to switching the mode of the IHS from the multi-socket mode to the multi-single socket mode such that a processor for each socket is a bootstrap processor, a particular processor for a particular socket is a bootstrap processor and remaining processors for the remaining sockets are application processors. Altering the parameters of the sockets of the IHS further includes altering a serial peripheral interface (SPI) multiplexing associated with each socket of the IHS. After switching the mode of the IHS from the multi-socket mode to the multi-single socket mode such that a processor for each socket is a bootstrap processor, simultaneously booting each bootstrap processor. After switching the mode of the IHS from the multi-socket mode to the multi-single socket mode such that a processor for each socket is a bootstrap processor, booting each bootstrap processor independently.

Innovative aspects of the subject matter described in this specification may be embodied in an information handling system (IHS), including two or more sockets; two or more processors associated with respective sockets of the two or more sockets; a baseband management controller (BMC) configured to receive a request to switch a mode of the IHS from a multi-socket mode to a multi-single socket mode; a complex programmable logic device (CPLD) in communication with the BMC and configured to: in response to receiving the request, place each socket of the IHS in an auxiliary power state independent of each other; after placing each socket of the IHS in the auxiliary power state, alter parameters of the sockets of the IHS, including: alter CPU straps, power sequencing, reset sequencing, and bus re-direction associated with one or more of the sockets of the IHS; and in response to altering the parameters of the sockets of the IHS, switch the mode of the IHS from the multi-socket mode to the multi-single socket mode such that a processor for each socket is a bootstrap processor.

Other embodiments of these aspects include corresponding methods, apparatus, and computer programs, configured to perform the actions of the methods, encoded on computer storage devices.

These and other embodiments may each optionally include one or more of the following features. For instance, the BMC is a single BMC. Further including an additional BMC, the BMC and the additional BMC in communication with respective sockets. The BMC is a primary BMC and the additional BMC is a secondary BMC. Further including an interposer coupled with a particular CPU socket of the two or more sockets, the interposer in communication with the CPLD and includes the secondary BMC. The IHS includes two sockets, and wherein the request includes a request to switch the mode of the IHS from a two-socket mode to a two one-socket mode. The IHS includes four sockets, and wherein the request includes a request to switch the mode of the IHS from a four-socket mode to a four one-socket mode. Prior to the CPLD switching the mode of the IHS from the multi-socket mode to the multi-single socket mode such that a processor for each socket is a bootstrap processor, a particular processor for a particular socket is a bootstrap processor and the remaining processor for the remaining sockets are application processors. The CPLD is further configured to alter a serial peripheral interface (SPI) multiplexing associated with each socket of the IHS.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
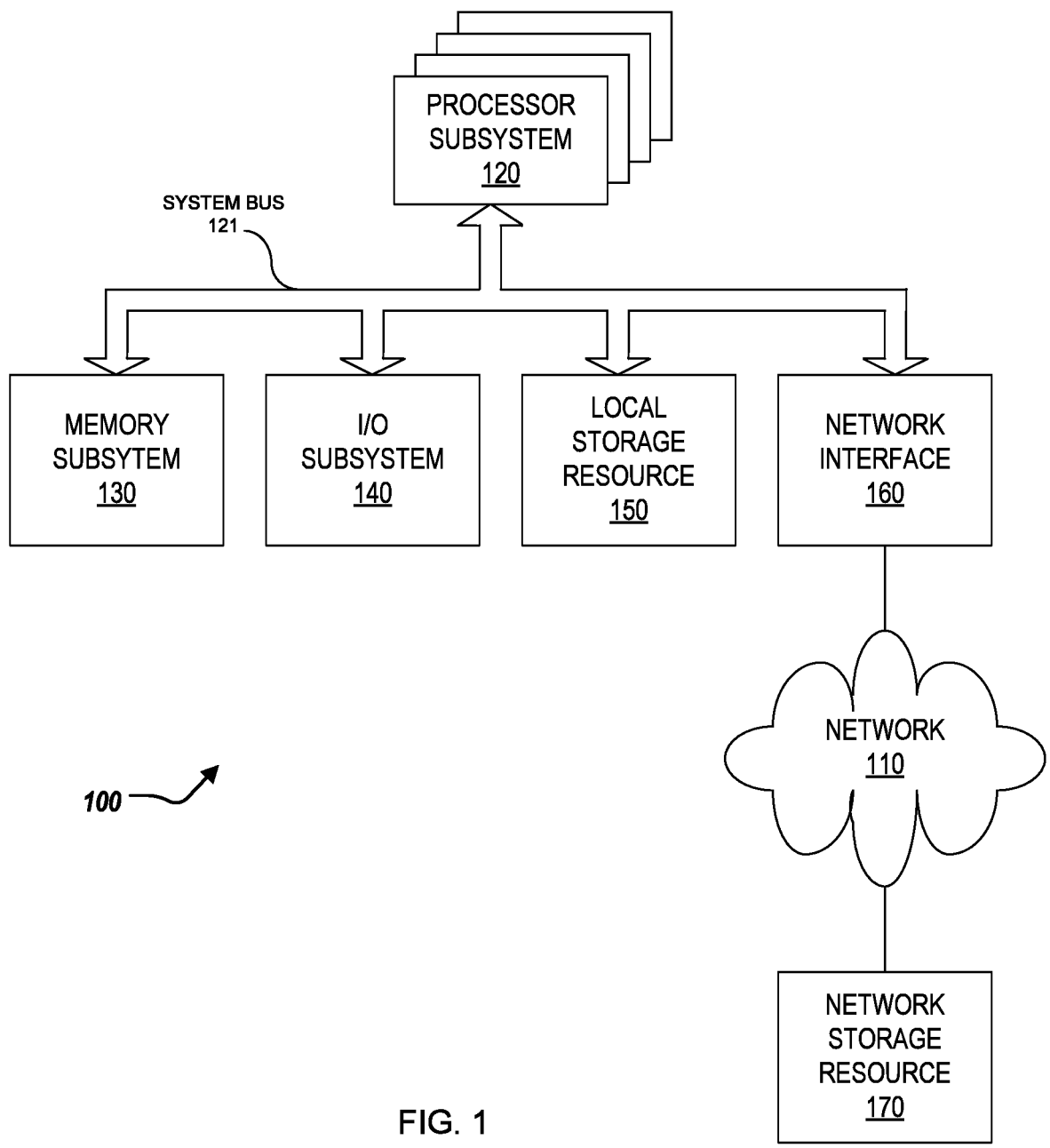
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
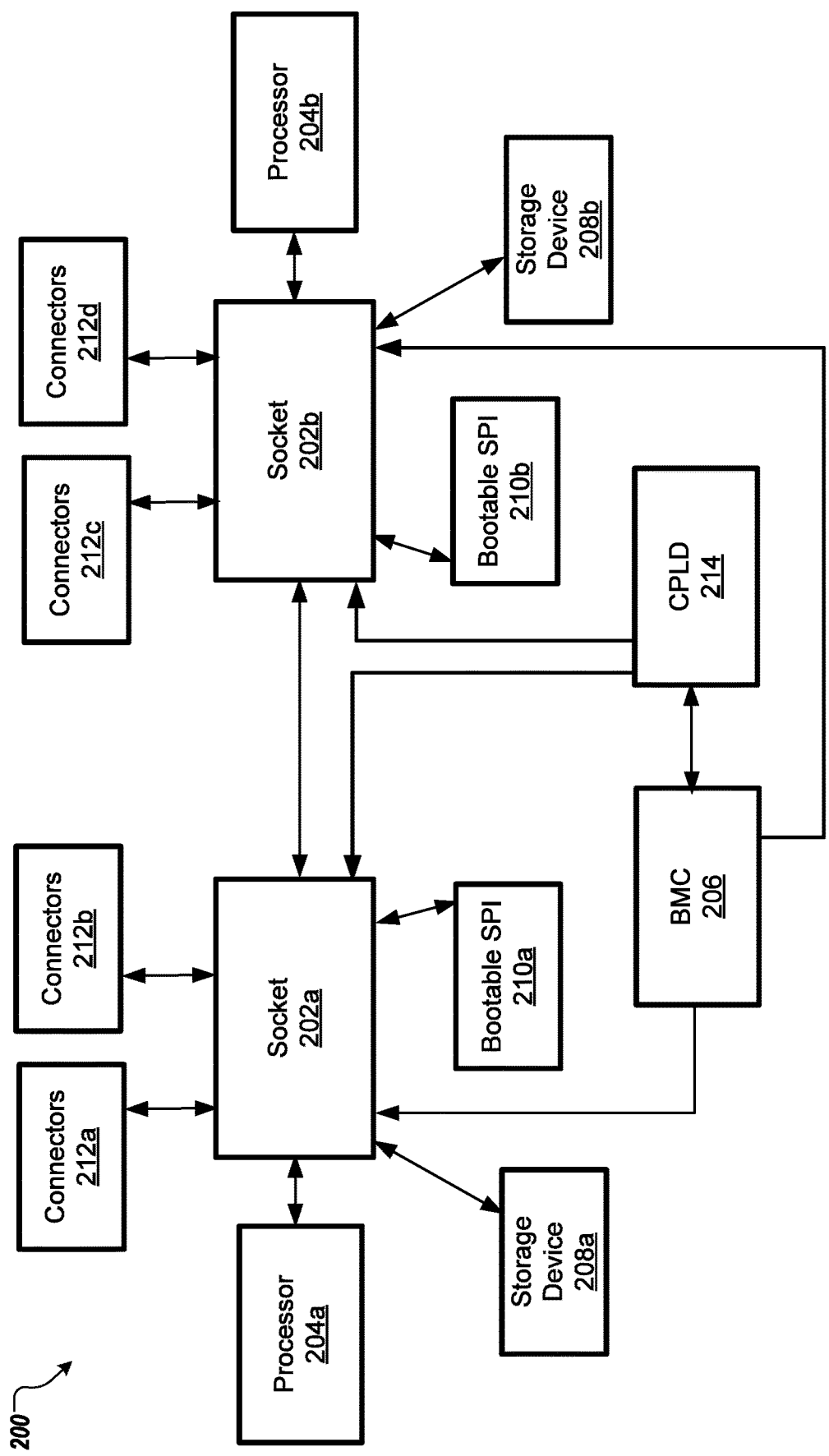
FIG. 2 is a block diagram of an information handling system, including multiple sockets and a single BMC.

Turning now to FIG. 2, FIG. 2 depicts a portion of an information handling system (IHS) 200. The IHS 200 can include a first (CPU) socket 202*a* and a second (CPU) socket 202*b* (collectively referred to as sockets 202). The first socket 202*a* can be coupled with or associated with a first processor (CPU) 204*a*; and the second socket 202*b* can be coupled with or associated with a second processor (CPU) 204*b* (processors 204*a*, 204*b* collectively referred to as processors 204). The IHS 200 can include any number of sockets and any number of corresponding processors (e.g., 2, 4, 6, or more). The IHS 200 can further include a baseband management controller (BMC) 206; storage devices 208*a*, 208*b* (collectively referred to as storage devices 208); bootable serial peripheral interfaces (SPI) 210*a*, 210*b* (collectively referred to as bootable SPIs 210); connectors (or I/O breakouts) 212*a*, 212*b*, 212*c*, 212*d* (collectively referred to as connectors 212); and a complex programmable logic device (CPLD) 214. The socket 202*a* can be in direct communication with the storage device 208*a*, the bootable SPI 210*a*, and the connectors 212*a*, 212*b*. The socket 202*b* can be in direct communication with the storage device 208*b*, the bootable SPI 210*b*, and the connectors 212*c*, 212*d*. The BMC 206 can be in communication with the sockets 202 and the CPLD 214. The CPLD can be in communication with the sockets 202. The sockets 202 can be in communication with one another. In some examples, the IHS 200 is similar to, or includes, the information handling system 100 of FIG. 1.

In general, the IHS 200 facilitates switching a processing mode thereof from a multi-socket mode to a multi-single socket mode. That is, the BMC 206 and the CPLD 214 can alter parameters associated with the sockets 202 to switch the processing mode of the environment 200 from the multi-socket mode to the multi-single socket mode, described further herein.

In some examples, the IHS 200 includes a single BMC—i.e., the BMC 206. The BMC 206 can manage multiple independent servers—e.g., the sockets 202 and processors 204, as well as common chassis or sled level functionality. In short, the (single) BMC 206 can provide a desired, different (e.g., scaled-down) functionality to the environment 200 as compared to a multi-BMC system. For example, the (single) BMC 206 enables servicing of both the sockets 202, disabling of video, dual serial over LAN, dual USB connections for virtual media, balance of host I/O and storage, and a common power for both CPU sockets 202.

In some implementations, the BMC 206 can receive a request to switch a mode of the IHS 200 from a multi-socket mode to a multi-single socket mode. In some examples, the request can be responsive to user input (e.g., a user interacting with the IHS 200) and/or from a remote console. In some examples, the BMC 206 can identify workload demands and/or fault conditions associated with the IHS 200 to switch the mode of the IHS 200 from the multi-socket mode to the multi-single socket mode.

In some examples, the IHS 200 can include two sockets (e.g., the sockets 202). The request can be a request to switch the mode of the IHS 200 from a two-socket mode to a two one-socket mode. In some examples, the IHS 200 can include four sockets (e.g., the sockets 202 and two additional sockets). The request can be a request to switch the mode of the IHS 200 from a four-socket mode to a four one-socket mode.

In some examples, the processor 204*a* can initially be a bootstrap processor and the processor 204*b* can be an application processor. That is, prior to switching the processing modes of the IHS 200 from the multi-socket mode to the multi-single socket mode, the processor 204*a* is a bootstrap processor and the processor 204*b* can be an application processor.

The CPLD 214 can facilitate switching the processing mode of the IHS 200 from the multi-socket mode to the multi-single socket mode, e.g., in response to direction from the BMC 206. In some implementations, in response to receiving the request, the CPLD 214 can place each socket 202 into an auxiliary power state. For example, the auxiliary power state can include a low power state, or a "cold" reset. In some examples, the CPLD 214 places each socket 202 into the auxiliary power state independent of each other. That is, each socket 202 is unaware that the other socket 202 is being placed in the auxiliary power state.

In some implementations, the CPLD 214, after placing each socket 202 in the auxiliary power state, alters parameters associated with the sockets 202. Specifically, through a "cold cycle" or a "cold reset," the CPLD 214 adjusts the parameters associated with the sockets 202 such that each of the processors 204 is a bootstrap processor, described further herein. In some examples, the socket 202*b* can include additional interfaces such that when the processor 204*b* boots, the processor 204*b* is an independent processor, described further herein.

In some examples, altering the parameters associated with the sockets 202 can include the CPLD 214 altering the CPU straps, power sequencing, reset sequencing, serial peripheral interface (SPI) multiplexing, and/or the bus direction associated with the sockets 202. Specifically, the CPLD 214 can facilitate bifurcation of the multi-socket system of the IHS 200 into separate one-socket systems by dynamically altering the CPU straps (e.g., bootstrap processor socket versus application processor socket), SPI multiplexing, power sequencings, reset handling, and bus directions, including coordination of grouped or individual node power and reset control. Furthermore, the CPLD 214 can facilitate bifurcation of the multi-socket system of the IHS 200 into separate one-socket systems by dynamic sensor enablement and separate processor management and multi-node level shared resource management—power monitoring, inventory, storage control, image management, multiple extensions of the BMC 206 into multi-BIOS domains and telemetry. In some examples, altering the parameters of the sockets 202 can include repurposing an inter-processor link of the sockets 202 for an additional I/O.

In some implementations, in response to altering the parameters of the sockets 202, the CPLD 214 switches the mode of the IHS 200 from the multi-socket mode to the multi-single socket mode such that the processor 204 for each socket 202 is a bootstrap processor. That is, each of the processors 204 can operate independently from each other as each processor 204 is a bootstrap processor. In some examples, after switching the mode of the IHS 200 from the multi-socket mode to the multi-single socket mode such that each processor 204 is a bootstrap processor, each processor 204 can operate using individual resources such as PCIe, USB interfaces, etc.

In some examples, after switching the mode of the IHS 200 from the multi-socket mode to the multi-single socket mode such that each processor 204 is a bootstrap processor, each of the processors 204 can be simultaneously booted. In some examples, after switching the mode of the IHS 200 from the multi-socket mode to the multi-single socket mode such that each processor 204 is a bootstrap processor, each of the processors 204 can be booted independently.

In some examples, after switching the mode of the IHS 200 from the multi-socket mode to the multi-single socket mode such that each processor 204 is a bootstrap processor, each processor 204 can operate independently while concurrently sharing common resources such as power supply, PCB planar, and cooling solutions between the processors 204.

In some examples, the processors 204 can boot in a multi-socket mode—e.g., a "2S" mode. In some examples, the processors 204 can boot in a multi-single socket mode—e.g., a "2x1S" mode. In some examples, only the processor 204*a* boots (the processor 204*b* offline). In some examples, only the processor 204*b* boots (the processor 204*a* offline).

In some examples, each of the processors 204 can be bootstrap processors. The CPLD 214 can facilitate switching the processing mode of the IHS 200 from the multi-single socket mode to the multi-socket mode, e.g., in response to direction from the BMC 206. In some implementations, in response to receiving the request, the CPLD 214 can place each socket 202 into an auxiliary power state. The CPLD 214, after placing each socket 202 in the auxiliary power state, alters parameters associated with the sockets 202 including altering the CPU straps, power sequencing, reset sequencing, serial peripheral interface (SPI) multiplexing, and/or the bus direction associated with the sockets 202. In response to altering the parameters of the sockets 202, the CPLD 214 switches the mode of the IHS 200 from the multi-single socket mode to the multi-socket mode such that the processor 204*a* can be a bootstrap processor and the processor 204*b* can be an application processor.

Figure 3:
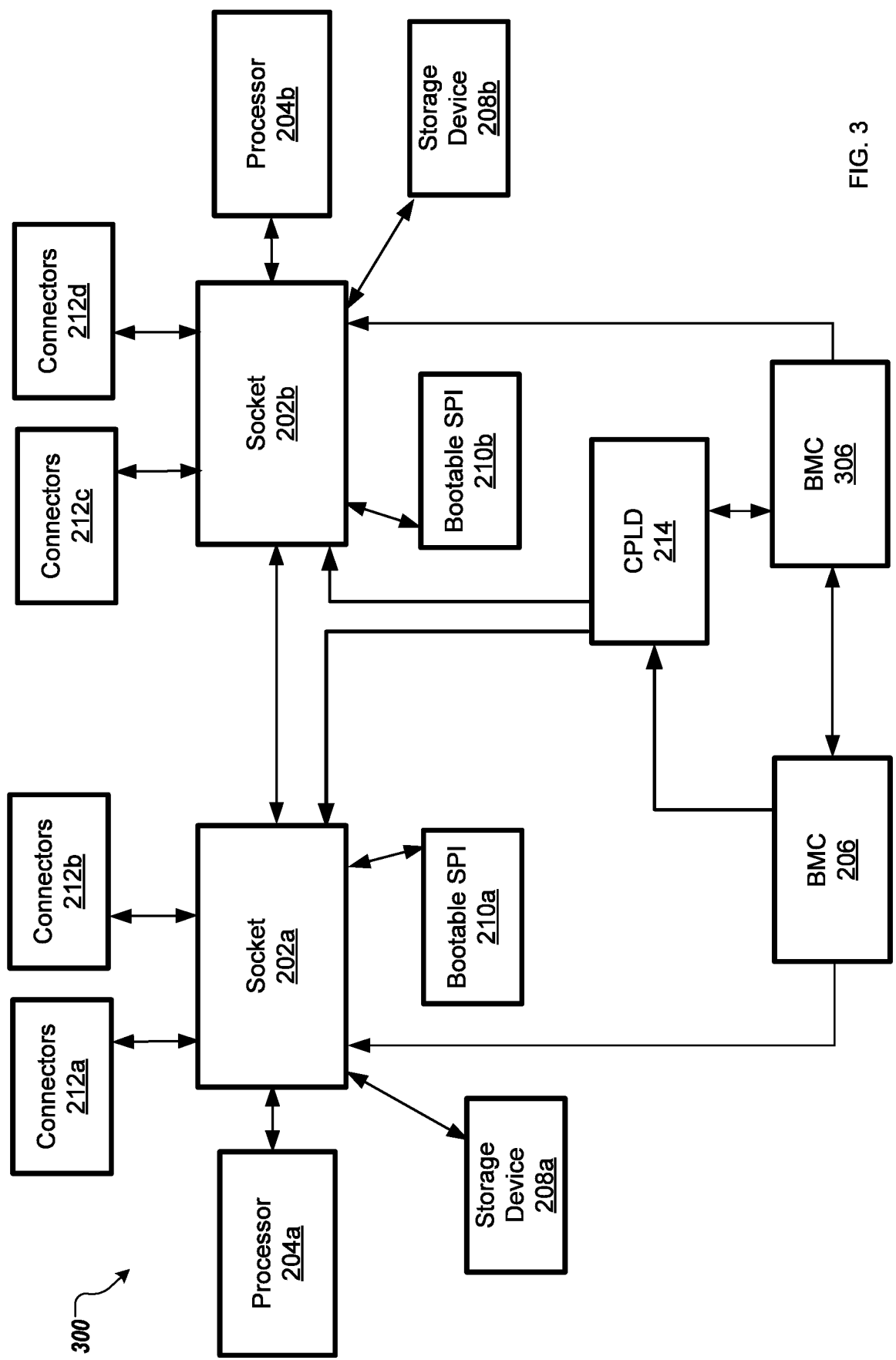
FIG. 3 is a block diagram of an information handling system, including multiple sockets and two BMCs.
Figure 4:
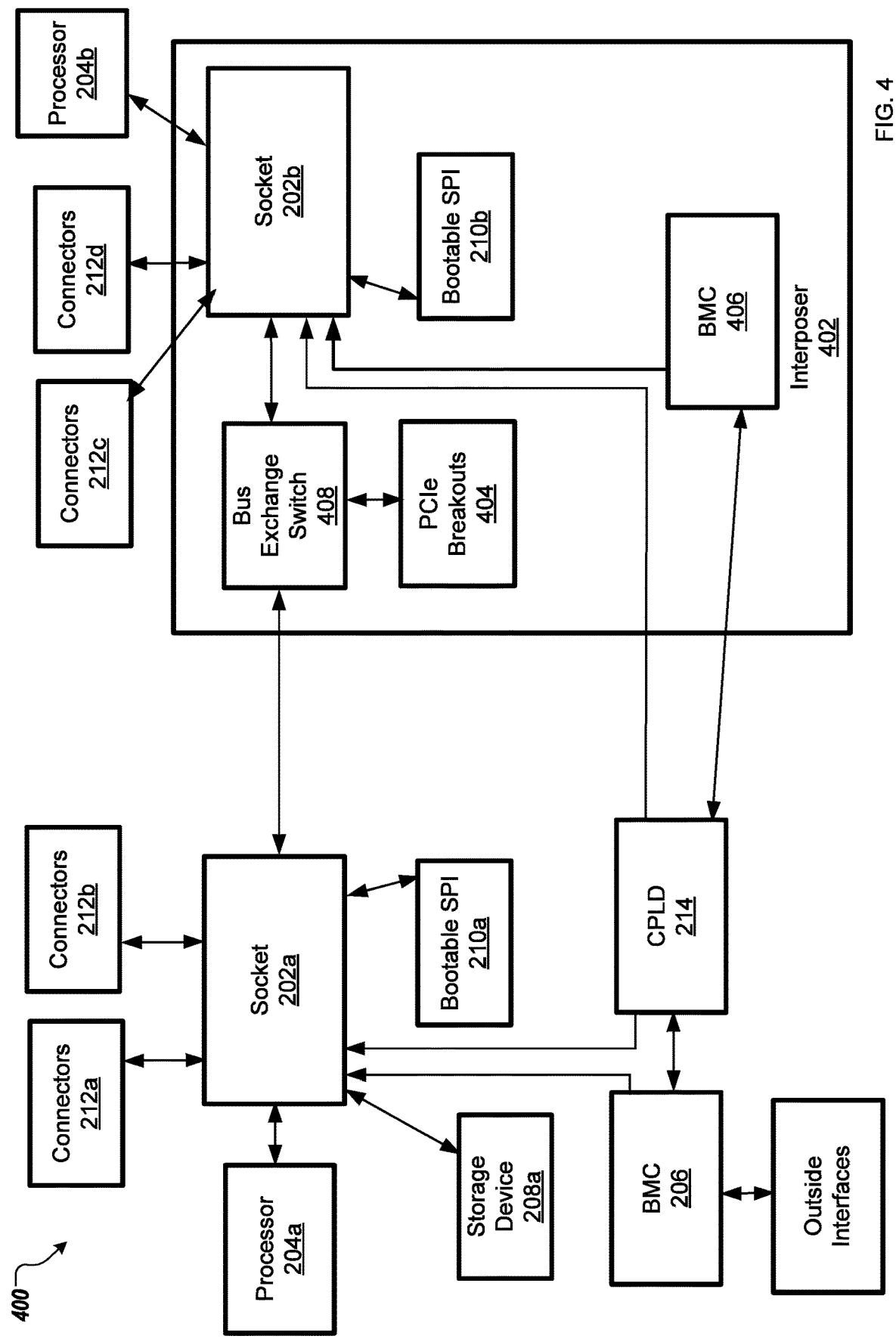
FIG. 4 is a block diagram of an information handling system, including multiple sockets and an interposer.

FIG. 3 illustrates the IHS 200 including an additional BMC 306, now shown as IHS 300. With respect to IHS 300, the BMC 206 is in communication with the socket 202*a* and the CPLD 214. The BMC 306 is in communication with the socket 202*b* and the CPLD 214. The CPLD 214 can include dual-BMC interfaces (e.g., SPI-X). Further, the BMC 206 is in communication with the BMC 306. The BMC 206 can be a primary BMC, and the BMC 306 can be the secondary BMC. The BMC 306 can be an upgradeable BMC—e.g., leveraging daughter cards; or an integrated BMC. Additionally, the dual BMCs enable separate video and vKVM, eSPI based serial over LAN, and MCTP VDM over PCIe. The BMC 206 can be considered the master for the IHS 300 and common elements and sensors of the BMC 206 and 306. The BMC 206 can proxy OOB network to the BMC 306 (e.g., when the BMC 306 is present and active). The BMC 206 can further provide instructions to the BMC 306 based on the desired configuration of the sockets 202 such as tasks that are to be performed by the BMC 306 FIG. 4 illustrates the IHS 200 include an interposer 402, shown as IHS 400. The interposer 402 can be coupled to the second socket 202*b*. The interposer 402 can include the second BMC 406, and further include PCIe breakouts 404, the bootable SPI 210*b*, and a bus exchange switch 408. The second socket 202*b* can be in communication with the bootable SPI 210*b* and the bus exchange switch 408. The second socket 202*b* can further be in communication with PCIe breakouts 404 through the bus exchange switch 408. The interposer 402 can be in communication with the CPLD 214, and specifically, the second BMC 406 can be in communication with the CPLD 214. The interposer 402 can facilitate switching of the processing mode of the IHS 400 from the multi-socket mode to the multi-single socket mode. For example, the interposer 402 can facilitate adjusting the parameters associated with the sockets 202 such that each of the processors 204 is a bootstrap processor. For example, the interposer 402 can facilitate altering the CPU straps, power sequencing, reset sequencing, serial peripheral interface (SPI) multiplexing, and/or the bus direction associated with the sockets 202. The CPLD 214 can further be in communication with the sockets 202. The bus exchange switch 408 can further be in communication with the socket 202a. In some examples, the bus exchange switch 408 can be between the sockets 202 (i.e., not included by the interposer 402). In some examples, altering the parameters of the sockets 202 can include an inter-processor link of the bus exchange switch 408 is routed as an inter-processor link or separate PCIe links.

Figure 5:
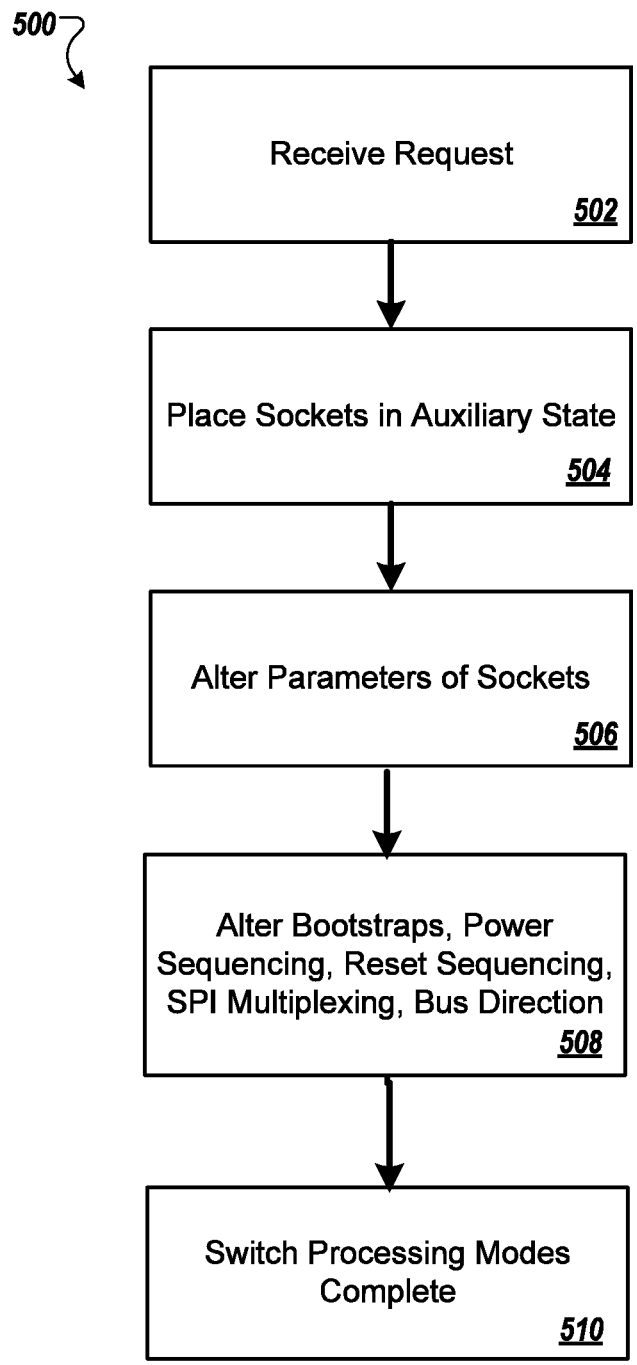
FIG. 5 is a flowchart depicting elements of a method for switching processing states of an information handling system.

FIG. 5 illustrates a flowchart depicting selected elements of a method 500 for adjusting a processing state of the information handling system from multi-socket mode to the multi-single socket mode. The method 500 may be performed by the information handling system 100, the IHS 200, 300, 400, the CPLD 214, the BMC 206, 306, and/or the interposer 402, described herein with reference to FIGS. 1-4, or another information handling system. It is noted that certain operations described in method 500 may be optional or may be rearranged in different embodiments.

The BMC 206 can receive a request to switch a mode of the IHS 200 from a multi-socket mode to a multi-single socket mode (502). In response to receiving the request, the CPLD 214 can place each socket 202 into an auxiliary power state (504). The CPLD 214, after placing each socket 202 in the auxiliary power state, alters parameters associated with the sockets 202 (506). The CPLD 214 alters the CPU straps, power sequencing, reset sequencing, serial peripheral interface (SPI) multiplexing, and/or the bus direction associated with the sockets 202 (508). In response to altering the parameters of the sockets 202, the CPLD 214 switches the mode of the IHS 200 from the multi-socket mode to the multi-single socket mode such that the processor 204 for each socket 202 is a bootstrap processor (510) on next power on.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or components.

What is claimed is:

1. A computer-implemented method, comprising:
receiving a request to switch a mode of an information handling system (IHS) from a multi-socket mode to a multi-single socket mode;
in response to receiving the request, placing each socket of the IHS in an auxiliary power state independent of each other;
after placing each socket of the IHS in the auxiliary power state, altering parameters of the sockets of the IHS, including:
altering CPU straps, power sequencing, reset sequencing, and bus re-direction associated with one or more of the sockets of the IHS; and
in response to altering the parameters of the sockets of the IHS, switching the mode of the IHS from the multi-socket mode to the multi-single socket mode such that a processor for each socket is a bootstrap processor.

2. The computer-implemented method of claim 1, wherein the IHS includes two sockets, and wherein receiving the request includes receiving the request to switch the mode of the IHS from a two-socket mode to a two one-socket mode.

3. The computer-implemented method of claim 1, wherein the IHS includes four sockets, and wherein receiving the request includes receiving the request to switch the mode of the IHS from a four-socket mode to a four one-socket mode.

4. The computer-implemented method of claim 1, wherein, prior to switching the mode of the IHS from the multi-socket mode to the multi-single socket mode such that a processor for each socket is a bootstrap processor, a particular processor for a particular socket is a bootstrap processor and remaining processors for the remaining sockets are application processors.

5. The computer-implemented method of claim 1, wherein altering the parameters of the sockets of the IHS further includes altering a serial peripheral interface (SPI) multiplexing associated with each socket of the IHS.

6. The computer-implemented method of claim 1, further comprising, after switching the mode of the IHS from the multi-socket mode to the multi-single socket mode such that a processor for each socket is a bootstrap processor, simultaneously booting each bootstrap processor.

7. The computer-implemented method of claim 1, further comprising, after switching the mode of the IHS from the multi-socket mode to the multi-single socket mode such that a processor for each socket is a bootstrap processor, booting each bootstrap processor independently.

8. An information handling system (IHS), comprising:
two or more sockets;

two or more processors associated with respective sockets of the two or more sockets;

a baseband management controller (BMC) configured to receive a request to switch a mode of the IHS from a multi-socket mode to a multi-single socket mode;

a complex programmable logic device (CPLD) in communication with the BMC and configured to:

in response to receiving the request, place each socket of the IHS in an auxiliary power state independent of each other;

after placing each socket of the IHS in the auxiliary power state, alter parameters of the sockets of the IHS, including:

alter CPU straps, power sequencing, reset sequencing, and bus re-direction associated with one or more of the sockets of the IHS; and in response to altering the parameters of the sockets of the IHS, switch the mode of the IHS from the multi-socket mode to the multi-single socket mode such that a processor for each socket is a bootstrap processor.

9. The IHS of claim 8, wherein the BMC is a single BMC.

10. The IHS of claim 8, further including an additional BMC, the BMC and the additional BMC in communication with respective sockets.

11. The IHS of claim 8, wherein the IHS includes two sockets, and wherein the request includes a request to switch the mode of the IHS from a two-socket mode to a two one-socket mode.

12. The IHS of claim 8, wherein the IHS includes four sockets, and wherein the request includes a request to switch the mode of the IHS from a four-socket mode to a four one-socket mode.

13. The IHS of claim 8, wherein, prior to the CPLD switching the mode of the IHS from the multi-socket mode to the multi-single socket mode such that a processor for each socket is a bootstrap processor, a particular processor for a particular socket is a bootstrap processor and the remaining processor for the remaining sockets are application processors.

14. The IHS of claim 8, wherein the CPLD is further configured to alter a serial peripheral interface (SPI) multiplexing associated with each socket of the IHS.

15. The IHS of claim 10, wherein the BMC is a primary BMC and the additional BMC is a secondary BMC.

16. The IHS of claim 15, further including an interposer coupled with a particular CPU socket of the two or more sockets, the interposer in communication with the CPLD and includes the secondary BMC.

17. A non-transitory computer-readable medium storing software comprising instructions executable by one or more computers which, upon such execution, cause the one or more computers to perform operations comprising:

receiving a request to switch a mode of an information handling system (IHS) from a multi-socket mode to a multi-single socket mode;

in response to receiving the request, placing each socket of the IHS in an auxiliary power state independent of each other;

after placing each socket of the IHS in the auxiliary power state, altering parameters of the sockets of the IHS, including:

altering CPU straps, power sequencing, reset sequencing, and bus direction associated with one or more of the sockets of the IHS; and in response to altering the parameters of the sockets of the IHS, switching the mode of the IHS from the multi-socket mode to the multi-single socket mode such that a processor for each socket is an independent bootstrap processor.

18. The computer-readable medium of claim 17, wherein the IHS includes two sockets, and wherein receiving the request includes receiving the request to switch the mode of the IHS from a two-socket mode to a two one-socket mode.

19. The computer-readable medium of claim 17, wherein the IHS includes four sockets, and wherein receiving the request includes receiving the request to switch the mode of the IHS from a four-socket mode to a four one-socket mode.

20. The computer-readable medium of claim 17, wherein, prior to switching the mode of the IHS from the multi-socket mode to the multi-single socket mode such that a processor for each socket is a bootstrap processor, a particular processor for a particular socket is a bootstrap processor and remaining processors for the remaining sockets are application processors.

* * * * *